(12) United States Patent
Noh et al.

(10) Patent No.: US 10,650,219 B2
(45) Date of Patent: May 12, 2020

(54) ELECTRONIC DEVICE WITH SENSOR MODULE

(71) Applicant: Samsung Electronics Co., Ltd., Gyeonggi-do (KR)

(72) Inventors: Hwanmyung Noh, Gyeonggi-do (KR); Young-Gwon Koo, Seoul (KR); Taewan Kim, Gyeonggi-do (KR); Min-Chul Sung, Seoul (KR); Seungwoon Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 231 days.

(21) Appl. No.: 15/814,531

(22) Filed: Nov. 16, 2017

(65) Prior Publication Data

US 2018/0165493 A1    Jun. 14, 2018

(30) Foreign Application Priority Data

Dec. 14, 2016  (KR) .......................... 10-2016-0170140

(51) Int. Cl.
    *G06K 9/00*        (2006.01)
    *G06F 1/16*        (2006.01)
    *G06F 3/0354*      (2013.01)

(52) U.S. Cl.
    CPC ............. *G06K 9/001* (2013.01); *G06F 1/169* (2013.01); *G06F 1/1656* (2013.01); *G06F 1/1662* (2013.01); *G06F 1/1671* (2013.01); *G06F 1/1684* (2013.01); *G06F 3/0354* (2013.01); *G06K 9/00006* (2013.01); *G06K 9/00013* (2013.01); *G06K 2009/00946* (2013.01)

(58) Field of Classification Search
    CPC ............... G06K 9/001; G06K 9/00006; G06K 2009/00946; G06K 9/00013; G06F 1/1656; G06F 1/1684; G06F 3/0354; G06F 1/16
    See application file for complete search history.

(56) References Cited

U.S. PATENT DOCUMENTS

| | | | |
|---|---|---|---|
| 2002/0044675 A1* | 4/2002 | Chikazawa | G06K 9/00013 382/124 |
| 2008/0265024 A1 | 10/2008 | Tracy et al. | |
| 2017/0091515 A1* | 3/2017 | Cao | G06F 1/1616 |
| 2019/0073045 A1* | 3/2019 | Lei | G06K 9/00006 |
| 2019/0095004 A1* | 3/2019 | Son | G06F 3/044 |

FOREIGN PATENT DOCUMENTS

CN      102087766 A      6/2011

* cited by examiner

*Primary Examiner* — Phuoc Tran
(74) *Attorney, Agent, or Firm* — Cha & Reiter, LLC.

(57) ABSTRACT

According to various example embodiments, an electronic device is disclosed. The electronic device includes a housing having a first surface facing a first direction and a second surface facing a second, opposing direction. A first area of the first surface includes a plurality of selectable input keys. A second area of the first surface excludes the plurality of keys. A sensor module, such as a fingerprint sensor, is installed to the first area.

18 Claims, 7 Drawing Sheets

ELECTRONIC DEVICE WITH SENSOR MODULE

CLAIM OF PRIORITY

This application claims the benefit under 35 U.S.C. § 119(a) of a Korean patent application filed in the Korean Intellectual Property Office on Dec. 14, 2016 and assigned Serial No. 10-2016-0170140, the entire disclosure of which is hereby incorporated by reference.

TECHNICAL FIELD

Various example embodiments of the present disclosure relate to a mounting location and mounting structure of a sensor module.

BACKGROUND

The use of an electronic device such as a smart phone, a tablet, and a wearable device has become daily routine, which has led to an increase in interest in security and usability issues of these devices. In fact, security and usability typically have a trade-off relationship, in which usability generally decreases when security increases.

When a Two-Dimensional (2D) fingerprint sensor is installed together with a display, fingerprint recognition enabling high-security can show improvements in usability. The increase in security and usability can be simultaneously achieved by organically associating user touch inputs using a Touch Sensitive Panel (TSP), with touch inputs for executing fingerprint recognition.

SUMMARY

A fingerprint recognition module may be mounted to the conventional electronic device, such as a notebook computer, is configured to be disposed to left and right spaces of a touch pad, and assembled using a fastener such as a screw from the inside of a housing (chassis). However, in the conventional mounting structure because since a fingerprint recognition module is disposed to left and right spaces of a touch pad, a space of an electronic device may involve a complex design resulting in deterioration in the aesthetic quality of the exterior design.

In addition, in the conventional mounting structure, since the fingerprint recognition module is fastened using a plurality of screws extending from the interior to the exterior of a housing of the electronic device, the number of assembly operations is increased.

Various example embodiments of the present disclosure provide a sensor mounting device having a fingerprint recognition module mounted to a keyboard area where a plurality of keys are arranged in an electronic device such as a notebook computer.

Various example embodiments of the present disclosure provide a sensor mounting device configured by inserting a sensor module into a seating recess from the outside to improve the process of assembly.

According to various example embodiments of the present disclosure, an electronic device may include a housing comprising a first surface facing a first direction and a second surface facing a second direction opposite to the first direction, a first area defined within the first surface in which a plurality of keys are installed; a second area within the first surface excluding the plurality of keys; and a sensor module installed within the first area.

According to various example embodiments of the present disclosure, an electronic device may include a keyboard housing including a plurality of keys disposed on an upper surface of the keyboard housing, a seating recess recessed in a downward direction in a first area of the keyboard housing in proximity to the plurality of keys, a sensor module disposed within the seating recess, at least one coupler securing a position of the sensor module within the seating recess, at least one fastener affixing the sensor module within the seating recess, and a connector electrically coupling the sensor module to a main Printed Circuit Board (PCB) disposed within the keyboard housing.

According to various example embodiments of the present disclosure, an electronic device may include a housing having a first surface facing a first direction, a second surface facing a second direction opposite to the first direction, and a keyboard area in which a plurality of keys are arranged on the first surface, a seating recess which is recessed in the second direction in the keyboard area and in which at least one opening are formed, a sensor module disposed within the seating recess and aligned with a border of the plurality of keys, at least coupler securing a position of the sensor module within the seating recess, at least one fastener affixing the sensor module to the seating recess at the secured position, and a connector electrically coupling the sensor module to a main PCB disposed within the housing.

According to various example embodiments of the present disclosure, an exterior of an electronic device can be simplified by mounting a sensor module to an area where a plurality of keys are disposed.

According to various example embodiments of the present disclosure, an electronic device has a structure in which a sensor module can be inserted into a seating recess from the outside, thereby improving the process of assembly.

DETAILED DESCRIPTION

Figure 1:
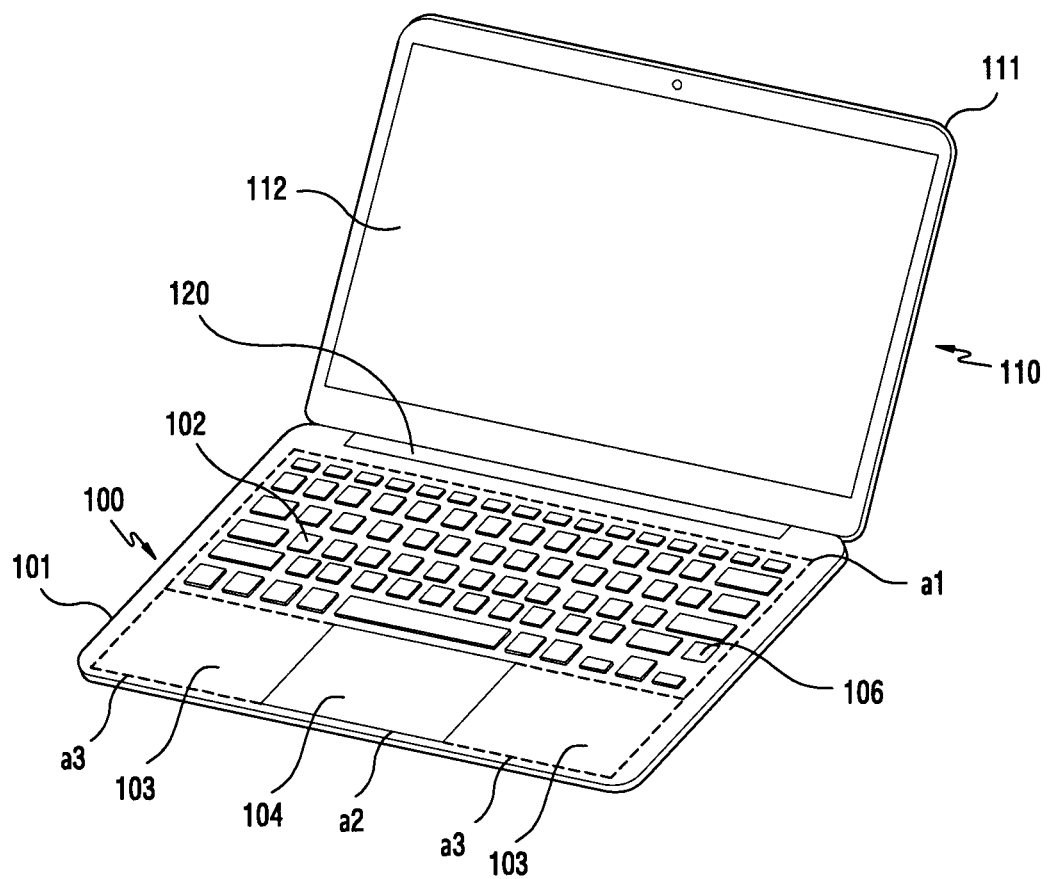
FIG. 1 is a perspective view illustrating an unfolding state of an electronic device mounted with a sensor module according to various example embodiments of the present disclosure.

Hereinafter, embodiments of the present disclosure will be described in connection with the accompanying drawings. The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications, equivalents, and/or alternatives within the present disclosure. In the description of the drawings, similar reference numerals may be used to designate similar elements.

Herein, the expressions "include", "may include" and other conjugates refer to the existence of a corresponding disclosed function, operation, or constituent element, and do not limit one or more additional functions, operations, or constituent elements. Further, "have", and their conjugates merely denote a certain feature, numeral, step, operation, element, component, or a combination thereof, and do not exclude the existence or possibility of addition of one or more other features, numerals, steps, operations, elements, components, or combinations thereof.

The expression "or" or "at least one of A or/and B" includes any or all of combinations of words listed together. For example, the expression "A or B" or "at least A or/and B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. Accordingly, a first element may be referred to as a second element, and likewise a second element may also be referred to as a first element, without departing from the embodiments of the present disclosure.

When an element is referred to as being "coupled" or "connected" to any other element, it should be understood that not only may the element be coupled or connected directly to the other element, but also a third element may be interposed therebetween. Contrarily, when an element is referred to as being "directly coupled" or "directly connected" to any other element, it should be understood that no other element is interposed between the two elements.

The terms herein are used merely to describe one or more certain embodiments and are not intended to limit the present disclosure. As used herein, singular forms may include plural forms as well, unless the context explicitly indicates otherwise. Further, all terms used herein, including technical and scientific terms, have the same meaning as commonly understood by those of skill in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in herein.

An electronic device according to the present disclosure may be a device including a communication function. For example, the electronic device may include at least one of a Smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g. a head-mounted-device, such as electronic glasses, electronic clothes, an electronic bracelet, an electronic necklace, an electronic appcessory, electronic tattoos, or a smartwatch).

The electronic device may also be a smart home appliance with a communication function such as a television, a digital versatile disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

The electronic device may also include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM), and a point of sale (POS) device.

The electronic device may also include at least one of a part of furniture or a building/structure, an electronic board, an electronic signature receiving device, a projector, and various kinds of measuring instruments (e.g., a water meter, an electric meter, a gas meter, and a radio wave meter).

Further, the electronic device may be a flexible device.

The electronic device may also be a combination of one or more of the aforementioned various devices. Further, it will be apparent to those skilled in the art that the electronic device, according to the present disclosure, is not limited to the aforementioned devices.

Herein, the term "user" in may indicate a person who uses an electronic device or a device (e.g., an artificial intelligence electronic device) that uses an electronic device.

FIG. 1 is a perspective view illustrating an unfolded state of an electronic device, equipped with a sensor module according to various example embodiments of the present disclosure.

Referring to FIG. 1, the electronic device according to various example embodiments may include a first electronic device 100 (e.g., a bottom portion of a computer body), a second electronic device 110 (e.g., a top portion including display), and a connection unit 120 for connecting the first and second electronic devices 100 and 110. The connection unit 120 may mechanically or electrically connect the first and second electronic devices 100 and 110. When the first and second electronic devices 100 and 110 are mechanically connected, a hinge may be employed providing a rotational axis, and a folding device may be provided for folded or unfolded configurations. If the first and second electronic devices 100 and 110 are electrically connected, a Flexible Printed Circuit Board (FPCB) may be employed to create the connection.

The first electronic device 100 according to various example embodiments may include a first housing 101 for protecting various electronic components and for serving as an exterior. The first housing 101 according to various example embodiments may include a first surface facing a first direction and a second surface facing a second direction opposite to the first direction. The first surface may be an inner surface of the first electronic device 100, and the second surface may be a bottom surface of the first electronic device 100. The first surface may be an upper surface of the electronic device 100, and the second surface may be a back surface of the electronic device 100. The first surface may be a front surface of the electronic device 100, and the second surface may be a rear surface of the electronic device 100.

The first housing 101 according to various example embodiments may have a plurality of keys 102, a touch pad 104, and a palm-rest 103 which are disposed on the first surface. Since the plurality of keys 102 are disposed to the first surface of the first housing 101, this portion may be referred to as a data input device or a keyboard or a keyboard housing. The plurality of keys 102 may be disposed in a QWERTY key arrangement. An area where the plurality of keys 102 disposed to the first housing 101 are disposed may be called a 'keyboard area.'

The first surface of the first housing 101 may include a first area a1 where the plurality of keys 102 are disposed, a second area a2 where the touch pad 104 is disposed, and a third area a3 where the palm-rest 103 is disposed. In the first area a1, the second and third areas a2 and a3 may be disposed side by side in parallel without overlapping with each other. Left and right third areas a3 may be disposed at both sides of the second area a2. Left and right palm-rests may be located in the third area a3.

The first electronic device 100 according to various example embodiments may include a sensor module 106, such as for example, a fingerprint recognition module or a biometric module. The sensor module 106 may be located in proximity to the first area a1, such as the plurality of keys 102. For example, the sensor module 106 may be disposed to an edge area of the first area a1, or may be disposed to a corner of the first area. In addition, the sensor module 106 may be disposed between the keys 102 in the first area a1.

The sensor module 106 according to various example embodiments may have an upper surface disposed to be coplanar with the upper surface of the first electronic device 100 or disposed in a slightly protruded manner. For example, the upper surface of the mounted sensor module 106 may be disposed in a protruded manner identically or similarly to the upper surface of the different keys 102.

In a state where the first and second housings 101 and 111 are folded with each other, in order to avoid interference (contact) with the second electronic device 100, the sensor module 106 according to various example embodiments may be disposed such that the upper surface of the sensor module 106 is disposed at a lower protrusion position than the different keys 102, or may be disposed to be coplanar with the upper surface of the first housing 101.

The second electronic device 110 according to various example embodiments may include the second housing 111 for storing various electronic components and for serving as an exterior. The second housing 111 according to various example embodiments may include a first surface facing a first direction and a second surface facing a second direction opposite to the first direction. The first surface may be an inner surface of the second electronic device 110, and the second surface may be an outer surface of the second electronic device 110. A display 112 may be disposed to the first surface of the second housing 110. The display 112 may be provided with a touch sensitive panel so as to operate as a touch screen. The second electronic device 110 provided with the display 112 may be referred to as a display device.

The display 112 according to various example embodiments is formed to be large in size to occupy most parts of a front surface of the second electronic device 110. Shortcut icons, a main menu switch key, time, weather, and the like may be displayed on a main home screen disposed to the display 112 to execute frequently used applications. In addition, a status bar may be formed on an upper side of the display 112 to display a state of the device 110, such as a battery charging state, received signal strength, or current time. A home button, a menu button, and a back button may be formed at a lower side of the display 112.

Hereinafter, a mounting structure of a sensor module mounted to a first area of a first electronic device will be described with reference to the accompanying drawings.

Figure 2:
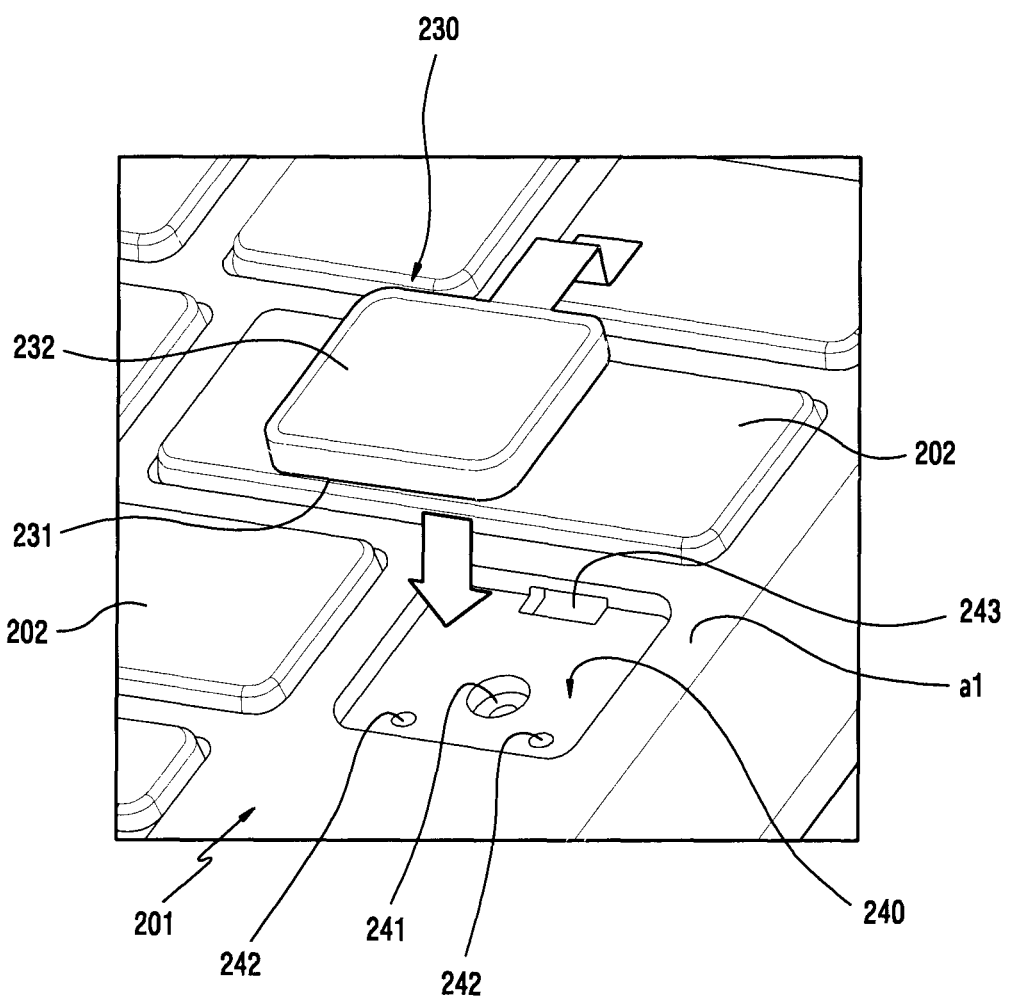
FIG. 2 is a perspective view illustrating a seating recess to which a sensor module is inserted according to various example embodiments of the present disclosure.

FIG. 2 is a perspective view illustrating a seating recess to which a sensor module is inserted according to various example embodiments of the present disclosure.

Referring to FIG. 2, a mounting device of a sensor module 230 according to various example embodiments may be located at an edge or corner in a first area a1 disposed on a first surface of a first housing 201. That is, a sensor of the sensor module 230 may be located at the corner of the first area a1. A seating recess 240 may be formed on the first surface of the first housing 201 to mount the sensor module 230. For example, the sensor module 230 mounted to the seating recess 240 may include a fingerprint recognition module or a biometric module.

If the fingerprint recognition module is mounted as an example of the sensor module 230 according to various example embodiments, the fingerprint recognition module may recognize a shape of fingerprint, white detecting a swipe or other touch input, to perform authentication by comparing with previously generated or previously stored fingerprint data. In order to recognize the shape of fingerprint, it is desirable to determine or detect one or more valleys and ridges of the fingerprint, and various mechanisms such as optical, ultrasonic, or capacitance mechanisms may be used to distinguish the valley/ridge.

The fingerprint recognition module according to various example embodiments may be configured to use Tx and Rx. For fingerprint recognition, Rx may be configured with a compact interval. When a user touches a fingerprint sensor configured using Tx and Rx, an electric charge is transferred from Tx to Rx, and a capacitance value received in Rx will be different according to a distance between a finger and Tx. Since this value is inversely proportional to the distance, a shape of one or more ridges and valleys may be generated based upon it. The fingerprint recognition module using the capacitance may be defined as a '1D' or '2D' fingerprint sensor according to a method of configuring Tx and Rx. The 1D fingerprint sensor is often called a finger sweeping shape or a 'swipe' type, and the 2D fingerprint sensor is called a finger pressing shape, or a 'touch' type.

The mounting device of the sensor module, as implemented according to various example embodiments, may include the seating recess 240 in which the sensor module 230 is disposed, and a fixing structure for securing the sensor module 230 to the seating recess 240.

The seating recess 240 according to various example embodiments may be configured in a recessed shape in a second direction on the first surface of the first housing. The seating recess 240 may be formed in a location disposed between a plurality of keys or a location disposed adjacent to a plurality of keys 202. For example, the seating recess 240 may be formed at an edge area or corner of a first area a1 where the plurality of keys 202 are disposed.

The sensor module 230 according to various example embodiments may include a sensor housing 231 and a sensor 232 mounted to the sensor housing 231. The sensor 232 is mounted such that only an upper surface is exposed to the inside, when it is mounted to the sensor housing 231. When the sensor module 230 is coupled to the seating recess 240, a device for fixing a mutual coupling position (or fixed position) may be further provided. The device for fixing the coupling position according to various example embodiments may include at least one coupling protrusion (such as that shown in FIG. 3) formed on the sensor housing 231.

In various example embodiments, the seating recess 240 may have a fastening hole 241 through which a fastener may be installed at a bottom center. The fastening hole 241 may be formed in a cylindrical shape at the bottom center of the seat recess 240. Therefore, a fastening force generated by installation of the fastener may operate in a vertical direction at a center of the sensor module 230. The seating recess 240 according to various example embodiments may be formed with at least one coupling opening 242 for fixing the coupling position of the sensor module 230, aligned in a vertical orientation. A coupling protrusion (shown in FIG. 3) may be inserted to the coupling opening 242 to provide the coupling position.

The seating recess 240 according to various example embodiments may have at least one connection opening 243 formed at an edge portion thereof, and a connection device, e.g., an FPCB, may be electrically connected to a main board through the connection opening 243. For example, the connection device may include an FPCB, a cable, or the like as a device for electrically connecting the sensor module 230 to a main board (not shown) disposed inside the first housing.

Figure 3:
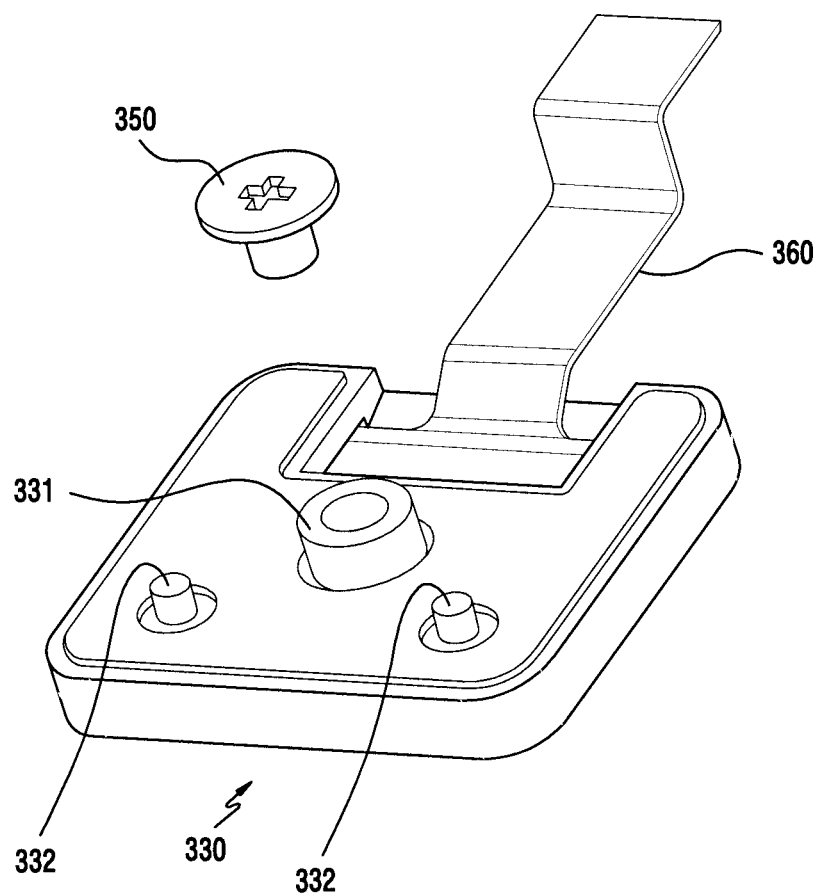
FIG. 3 is a perspective view illustrating a bottom portion of a sensor module according to various example embodiments of the present disclosure.

FIG. 3 is a perspective view illustrating a bottom portion of a sensor module according to various example embodiments of the present disclosure.

Referring to FIG. 3, a sensor housing 330 according to various example embodiments may be the same as the sensor housing 231 of FIG. 2 (but showing an underside thereof). The sensor housing 330 according to various example embodiments may have at least one or more protrusions 331 and 332 formed at a bottom portion thereof. For example, the coupling protrusion 331 and at least one positioning protrusion 332 for fixing a coupling position may be formed at the bottom of the sensor housing 330.

The coupling protrusion 331 according to various example embodiments may be formed on a bottom surface of the sensor housing 330. The coupling protrusion 331 may protrude in a second direction on the bottom of the sensor housing 330, and may be formed in a cylindrical shape and may also be hollow. The coupling protrusion 331 may be inserted into the coupling opening (as shown in FIG. 2).

The positioning protrusions 332 according to various example embodiments may be formed on the bottom surface of the sensor housing 330. The positioning protrusions 332 may be formed as pair and disposed relative to the coupling protrusion 331. The positioning protrusions 332 may protrude in the second direction on the bottom of the sensor housing 330, and may also be formed in a cylindrical shape.

An FPCB 360 may be extracted at one part of the bottom of the sensor housing 330, and the extracted FPCB 360 may be connected to the main board through the connection opening (shown in FIG. 2). A reference numeral 350 denotes a fastener.

Figure 4:
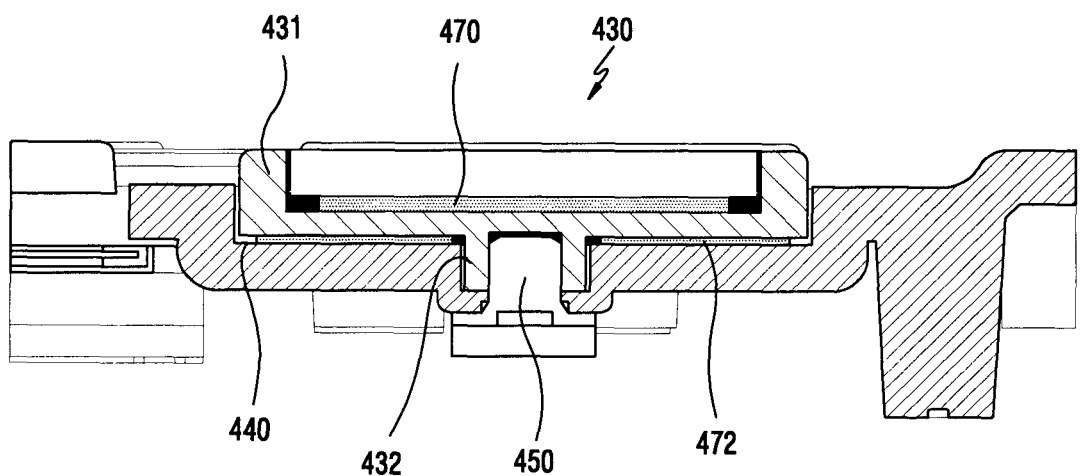
FIG. 4 is a cross-sectional view illustrating a mounting state of a sensor module according to various example embodiments of the present disclosure.

FIG. 4 is a cross-sectional view illustrating a mounting state of a sensor module according to various example embodiments of the present disclosure.

Referring to FIG. 4, a fixing structure of the sensor module according to various example embodiments may fix (e.g., affix or secure) a sensor module 430 to the seating recess 440. The fixing structure may include a coupling protrusion 432 protruding in a second direction on a bottom surface of a sensor housing 431, and a fastener 450 fastened to the coupling protrusion 432 to secure the sensor housing 431 to the seating recess 440. For example, the fastener 450 may include a screw or some other suitable fastener. The fastener 450 may be coupled to a coupling unit in a screw manner by passing through a coupling hole.

The sensor module 430 according to various example embodiments may be mounted to the seating recess 440, and thereafter may be mounted such that one part thereof protrudes. A protrusion height of the part of the sensor module 430 in consideration may be configured to be roughly less than or equal to a protrusion height of the keys. For example, a mounting height of the sensor module 430, that is, a height protruding from a first surface, should not cause any undue interference when folding or unfolding the second electronic device, which it could if its height were greater than those of the corresponding keys. Accordingly, an upper surface of the sensor module 430 may be mounted as to be approximately coplanar with the first surface.

A sensor of the sensor module 430 according to various example embodiments may also be attached to the sensor housing 431 by means of a first double-sided tape 470, and the sensor housing 431 may be attached to the seating recess 440 by means of a second double-sided tape 472. The sensor module 430 may be primarily fixed to the seating recess 440 by means of the second double-sided tape 472, and may be secondarily fixed to the seating recess 440 by means of a fixing structure.

The mounted sensor module 430 according to various example embodiments may be disposed to overlap with the bottom of the seating recess 440, and may be disposed side by side without overlapping with other keys.

Figure 5:
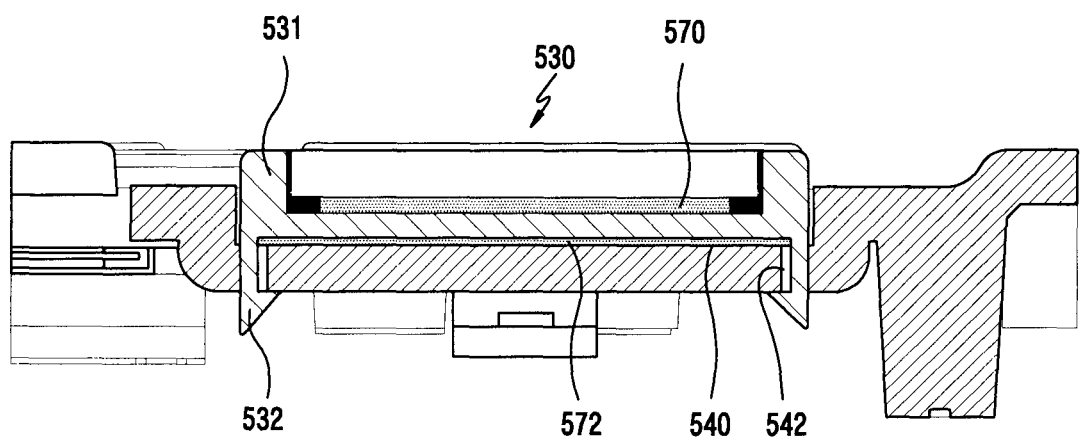
FIG. 5 is a cross-sectional view illustrating another mounting state of a sensor module according to various example embodiments of the present disclosure.

FIG. 5 is a cross-sectional view illustrating another mounting state of a sensor module according to various example embodiments of the present disclosure.

Referring to FIG. 5, a fixing structure of a sensor module 530 according to various example embodiments may serve to secure the sensor module 530 to a seating recess 540. The fixing structure may include at least one latching protrusion 532, protruding in a second direction on a bottom surface of a sensor housing 531, and a latching hole 542 latched by the latching protrusion 532 to secure the sensor housing 531 to the seating recess 540.

A sensor of the sensor module 530, according to various example embodiments, may be attached to the sensor housing 531 by means of a first double-sided tape 570, and the sensor housing 531 may be attached to the seating recess 540 by means of a second double-sided tape 572. The sensor module 530 may be primarily affixed to the seating recess 540 by means of the second double-sided tape 572, and may be secondarily fixed to the seating recess 540 by means of the fixing structure.

The fixing structure according to various example embodiments may be configured with at least one pair of latching structures, and the latching protrusion 532 having a hook shape may be formed in pair at a boundary portion of the sensor housing 531. A fastening force of the sensor module 530 may face a vertical direction due to coupling of the latching protrusion 532.

Figure 6:
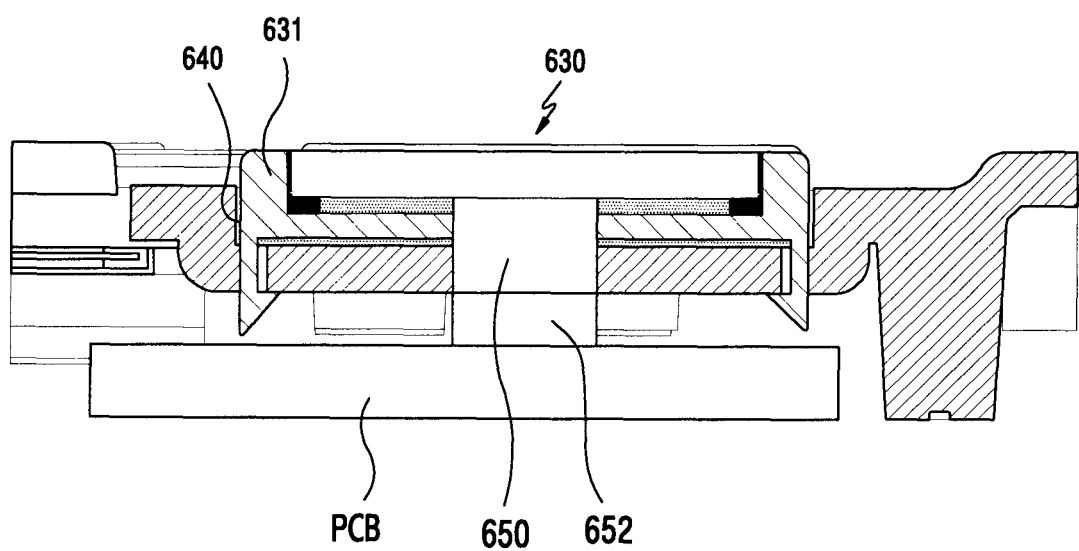
FIG. 6 is a cross-sectional view illustrating another mounting state of a sensor module according to various example embodiments of the present disclosure.

FIG. 6 is a cross-sectional view illustrating another mounting state of a sensor module according to various example embodiments of the present disclosure.

Referring to FIG. 6, a fixing structure of the sensor module according to various example embodiments is the same as the fixing structure based on coupling of the latching protrusion 532 and the latching hole 542 shown in FIG. 5, and thus descriptions thereof will be omitted. In addition, the fixing structure of the sensor module according to various example embodiments is the same as the attaching structure based on the first and second double-sided tapes 570 and 572 shown in FIG. 5, and thus detailed descriptions thereof will be omitted.

It is described above that the sensor module is electrically connected to the main board by using an FPCB. In order to decrease the number of assembling operations, a connection device may be configured to electrically connect a sensor module 630 to a main board (PCB) while mounting the sensor module 630 to a seating recess 640.

The connection device according to various example embodiments may include a first connector 650 disposed to protrude in a second direction on a bottom surface of the sensor housing 631 and a second connector 652 coupled to the first connector 650 to electrically connect the sensor module 630 to the main board (PCB). The first connector 650 may be disposed centrally at a bottom of a sensor so as to be electrically connected to the sensor, and the second connector 652 may be disposed towards the main board (PCB). The first and second connectors 650 and 652 may be configured as a male or female connector type. The first and second connectors 650 and 652 may be coupled in a vertical direction to be connected with each other.

A connection of the first and second connectors 650 and 652 according to various example embodiments may be a device for fixing the sensor module 630 to the seating recess 640.

Figure 7:
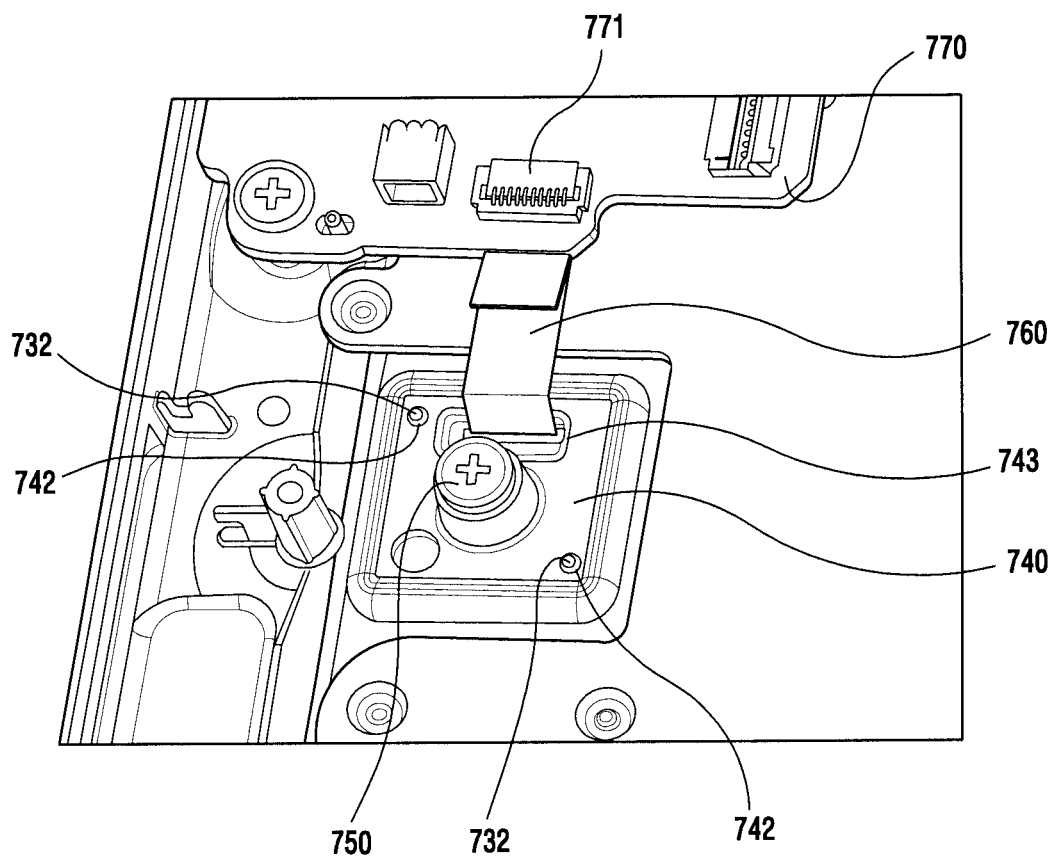
FIG. 7 is a perspective view illustrating a state in which a fingerprint recognition module is mounted to a seating recess, viewed from the inside of a housing, according to various example embodiments of the present disclosure.

FIG. 7 is a perspective view illustrating a state in which a fingerprint recognition module is mounted to a seating recess, viewed from the inside of a housing, according to various example embodiments of the present disclosure.

Referring to FIG. 7, when the fingerprint recognition module (as shown in FIG. 2 and FIG. 3) according to various example embodiments is mounted to a seating recess 740, an FPCB 760 of the fingerprint recognition module may be electrically connected to a main PCB 770 by using a 'slim' connector 771 which passes through a connection opening 743. The slim connector 771 may serve to connect an end portion of the FPCB 760 to the main PCB 770.

In the mounting state of the fingerprint recognition module according to various example embodiments, a coupling protrusion (shown in FIG. 3) of the fingerprint recognition module may pass through a coupling opening of a seating recess and may be fastened in a vertical direction by means of a fastener 750 and thereby secured to a seating recess 740. In addition, two different coupling protrusions 732 may be inserted respectively into two coupling openings 742 formed in the seating recess. For example, a position at which the coupling opening 742 formed in the seating recess 740 is formed may be changed. For example, the coupling opening 242 of FIG. 2 may be formed symmetrically to one side of the coupling opening 241 at a center thereof, and the coupling opening 742 of FIG. 7 may be formed in a diagonal direction with respect to the coupling opening at a center thereof.

While the present disclosure has been particularly shown and described with reference to embodiments thereof, it will be understood by those of ordinary skill in the art that various changes in form and details may be made therein without departing from the disclosure as defined by the appended claims and their equivalents. The embodiments should be considered in a descriptive sense only and not for purposes of limitation. Therefore, the disclosure is defined not by the detailed description of the disclosure but by the appended claims and their equivalents, and all differences will be construed as being included in the present disclosure.

What is claimed is:

1. An electronic device comprising:
   a housing including a first surface facing a first direction and a second surface facing a second direction opposite to the first direction;
   a first area defined within the first surface in which a plurality of keys are installed;
   a second area within the first surface excluding the plurality of keys;
   a sensor module installed within the first area;
   a seating recess formed in the first surface and recessed in the second direction; and
   a fastener securing the sensor module within the seating recess,
   wherein the fastener passes through a fastening hole formed at a bottom center of the seating recess.

2. The electronic device of claim 1, wherein the second area comprises:
   a touch pad mounted within the housing in alignment with a boundary of the first area; and
   palm rests mounted at each side of the second area, the touch pad disposed between the palm rests.

3. The electronic device of claim 1,
   wherein the sensor module is disposed within the seating recess, and is inserted to the seating recess from the outside of the housing.

4. The electronic device of claim 3, further comprising:
   a connector electrically coupling the sensor module to a processor of the electronic device.

5. The electronic device of claim 1, wherein the sensor module is disposed proximate to a border of the first area.

6. The electronic device of claim 1, wherein the sensor module is disposed proximate to a corner of the first area.

7. The electronic device of claim 1, wherein the sensor module is disposed between particular keys of the plurality of keys disposed in an edge region of the first area proximate to a border of the first area.

8. The electronic device of claim 3, wherein when the sensor module is disposed within the seating recess, the sensor module partially protrudes from the seating recess.

9. The electronic device of claim 3, wherein the sensor module comprises a fingerprint recognition module, including:
   a sensor housing formed to include a cavity; and
   a fingerprint recognition sensor secured within the cavity.

10. The electronic device of claim 9, wherein the fastener includes:
    a coupler protruding in the second direction on a bottom surface of the sensor housing; and
    a mechanical fastener secured to the coupler to affix the sensor housing to the seating recess.

11. The electronic device of claim 9, wherein the sensor housing further comprises a coupler securing a position of the sensor housing when secured to the seating recess, the coupler including:
    at least one coupling protrusion protruding in the second direction and disposed on a bottom surface of the sensor housing, and
    wherein at least one coupling opening is formed at a bottom of the seating recess in which the at least one coupling protrusion is inserted.

12. The electronic device of claim 4, wherein the seating recess includes at least one connection opening formed proximate to an edge of the seating recess, and
    wherein the connector passes through the connection opening to electrically couple to the processor of the electronic device.

13. The electronic device of claim 9, wherein the fingerprint recognition sensor is secured to the sensor housing by a first double-sided tape, and the sensor housing is secured to the seating recess by a second double-sided tape.

14. The electronic device of claim 1, further comprising a display device that is rotatably coupled to the housing by a hinge, and when the display device is disposed against the first surface of the housing when the electronic device is disposed in a closed configuration.

15. An electronic device comprising:
a keyboard housing including a plurality of keys disposed on an upper surface of the keyboard housing;
a seating recess recessed in a downward direction in a first area of the keyboard housing in proximity to the plurality of keys;
a sensor module disposed within the seating recess;
at least one coupler securing a position of the sensor module within the seating recess;
at least one fastener affixing the sensor module within the seating recess; and
a connector electrically coupling the sensor module to a main Printed Circuit Board (PCB) disposed within the keyboard housing,
wherein the fastener includes at least one of a mechanical fastener that affixes the position of the sensor module by coupling with a protrusion disposed at a center portion of the sensor module, and one or more protrusions disposed proximate to one or more edges of the sensor module which protrude from the sensor module in a vertical direction.

16. The device of claim 15, wherein an upper surface of the sensor module is disposed to be either substantially coplanar with the upper surface of the keyboard housing, or protruding from the upper surface of the keyboard housing.

17. An electronic device comprising:
a housing having a first surface facing a first direction, a second surface facing a second direction opposite to the first direction, and a keyboard area in which a plurality of keys are arranged on the first surface;
a seating recess which is recessed in the second direction in the keyboard area and in which at least one opening are formed;
a sensor module disposed within the seating recess and aligned with a border of the plurality of keys;
at least coupler securing a position of the sensor module within the seating recess;
at least one fastener affixing the sensor module to the seating recess at the secured position; and
a connector electrically coupling the sensor module to a main PCB disposed within the housing,
wherein the at least one fastener includes at least one of a mechanical fastener that affixes the position of the sensor module by coupling with a protrusion disposed at a center portion of the sensor module, and one or more protrusions disposed proximate to one or more edges of the sensor module which protrude from the sensor module in a vertical direction.

18. The device of claim 17, wherein the connector comprises:
a Flexible PCB (FPCB) extending from the sensor module;
a connection opening formed in the seating recess through which the FPCB passes; and
an electrical connector connecting the FPCB to the main PCB.

* * * * *